United States Patent
Savitsky et al.

(10) Patent No.: US 10,380,919 B2
(45) Date of Patent: Aug. 13, 2019

(54) SYSTEM AND METHOD FOR EXTENDED SPECTRUM ULTRASOUND TRAINING USING ANIMATE AND INANIMATE TRAINING OBJECTS

(71) Applicant: SonoSim, Inc., Santa Monica, CA (US)

(72) Inventors: Eric Savitsky, Malibu, CA (US); Gabriele Nataneli, Los Angeles, CA (US); Dan Katz, Encino, CA (US)

(73) Assignee: SONOSIM, INC., Santa Monica, CA (US)

( * ) Notice: Subject to any disclaimer, the term of this patent is extended or adjusted under 35 U.S.C. 154(b) by 1288 days.

(21) Appl. No.: 14/548,210

(22) Filed: Nov. 19, 2014

(65) Prior Publication Data

US 2015/0140538 A1 May 21, 2015

Related U.S. Application Data

(60) Provisional application No. 61/907,276, filed on Nov. 21, 2013.

(51) Int. Cl.
*G09B 23/28* (2006.01)

(52) U.S. Cl.
CPC .................. *G09B 23/286* (2013.01)

(58) Field of Classification Search
CPC .................................................. G09B 23/286
USPC ........................................................ 434/267
See application file for complete search history.

(56) References Cited

U.S. PATENT DOCUMENTS

| | | | |
|---|---|---|---|
| 5,609,485 A * | 3/1997 | Bergman | G01S 7/52055 128/916 |
| 6,193,657 B1 | 2/2001 | Drapkin | |
| 6,929,481 B1 | 8/2005 | Alexander | |
| 7,806,696 B2 | 10/2010 | Alexander | |
| 7,833,018 B2 | 11/2010 | Alexander | |
| 7,931,470 B2 | 4/2011 | Alexander | |
| 8,244,506 B2 | 8/2012 | Butsev | |
| 8,428,326 B2 | 4/2013 | Falk | |
| 8,480,406 B2 | 7/2013 | Alexander | |
| 8,721,344 B2 | 5/2014 | Marmaropoulos | |
| 2002/0088926 A1 | 7/2002 | Prasser | |
| 2009/0130642 A1 | 5/2009 | Tada | |
| 2013/0065211 A1 | 3/2013 | Amso | |
| 2013/0179306 A1* | 7/2013 | Want | G06Q 20/3278 705/26.81 |

FOREIGN PATENT DOCUMENTS

EP 2801966 11/2014

OTHER PUBLICATIONS

Chung, Gregory, "Effects of Simulation-Based Practice on Focused Assessment . . . ", Military Medicine, Oct. 2013, vol. 178.

* cited by examiner

*Primary Examiner* — Robert P Bullington
(74) *Attorney, Agent, or Firm* — Cislo & Thomas, LLP

(57) ABSTRACT

A system and method for extended spectrum ultrasound training using tags placed on animate and/or inanimate objects. The system combines the use of tags, a reader, and a 3-DOF motion tracker to train a user in finding image windows and optimal image views in an ultrasound simulation environment.

20 Claims, 8 Drawing Sheets

SYSTEM AND METHOD FOR EXTENDED SPECTRUM ULTRASOUND TRAINING USING ANIMATE AND INANIMATE TRAINING OBJECTS

CROSS-REFERENCE TO RELATED APPLICATION

This patent application claims the benefit of U.S. Provisional Patent Application Ser. No. 61/907,276, filed Nov. 21, 2013, entitled "SYSTEM AND METHOD FOR EXTENDED SPECTRUM ULTRASOUND TRAINING USING ANIMATE AND INANIMATE TRAINING OBJECTS," which application is incorporated in its entirety here by this reference.

STATEMENT REGARDING FEDERALLY SPONSORED RESEARCH

This invention was made with government support under Contract No. W81XWH-11-C-0529 awarded by the US Army Medical Research and Material Command. The government has certain rights in the invention.

TECHNICAL FIELD

This invention relates to extending the capabilities of ultrasound training simulation to support traditional modalities based on animate (e.g., live human model) and inanimate (e.g., training mannequins) objects.

BACKGROUND

The acquisition of ultrasound skills requires ability of finding an image window (i.e., placing the ultrasound transducer over a site of interest that also enables acoustic sound wave transmission towards the structure of interest). Upon finding an image window, the operator must acquire an optimal view. This typically involves rotation of the transducer around a fixed axis or point. Both of these skills require practice and the development of psychomotor skills that are married to didactic instruction and an understanding of underlying anatomy. Therefore, an effective tool for learning ultrasound must allow the user to practice both rotational and translational movements of the ultrasound probe. This invention introduces a low-cost solution that allows users to practice the skills of image window and optimal view acquisition in a simulated environment.

Methods of ultrasound simulation have been developed that force trainees to both locate an image window and subsequently find an optimal image view. These methods rely upon complex six degrees-of-freedom (6-DOF) motion tracking technologies coupled with inanimate mannequins. Issues of calibration, cost, interference, and ease-of-use issues make 6-DOF ultrasound simulations expensive and cumbersome. Many institutions and individuals who wish to teach or learn ultrasonography do not have access to expensive training mannequins equipped with 6-DOF motion sensing technology.

For the foregoing reasons there is a need for a more accessible system and method for ultrasound simulation that does not require expensive 6-DOF motion sensing technology.

SUMMARY

The present invention is directed to a system and method of ultrasound training that uses Near Field Communication (NFC) tags or similar radio frequency tags that may be placed on animate or inanimate models to define desired locations over the extent of the body that are linked to pre-selected image windows. Trainees use an NFC reader coupled with a rotational 3-DOF motion tracker to manipulate a virtual ultrasound probe. Ultrasound simulation software displays a graphical user interface, a virtual body, the virtual ultrasound probe, and an ultrasound image. The virtual ultrasound probe and ultrasound image continuously update based on the manipulation of the reader and the 3-DOF motion tracker. In this way trainees may train in finding image windows and optimal image views.

DETAILED DESCRIPTION OF THE INVENTION

Figure 1:
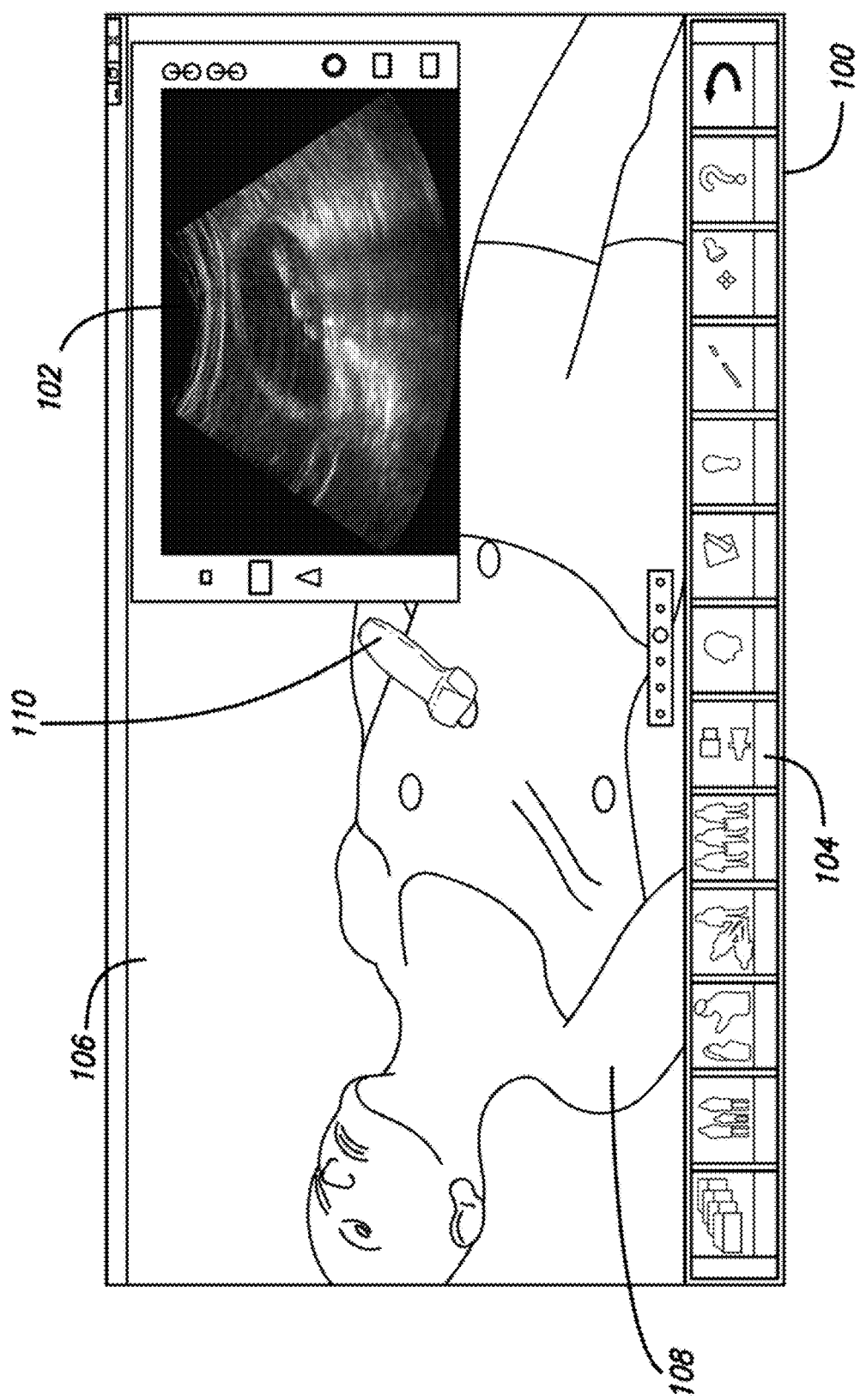
FIG. 1 shows an ultrasound simulation display in accordance with embodiments of the present disclosure.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention and claims.

It will be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term 6-DOF means six degrees of freedom and refers to the freedom of movement of a rigid body in three-dimensional space. Specifically, the body is free to move in three translational degrees of forward/back, up/down, left/right, and three rotational degrees of pitch, yaw, and roll. The term rotational 3-DOF refers to the pitch, yaw, and roll.

The term tag is used herein to refer to both transponders and beacons. Generally, NFC, RFID, and other types of passive tags are referred to transponders, and active tags such as ones using Bluetooth Low Energy are referred to as beacons.

The term reader is used to refer to the device that emits the query signal to detect the ID of the tag.

A preferred embodiment of the extended-spectrum ultrasound simulation system comprises:
  an animate or inanimate training object 204, 302, or 402 that serves as a scanning surface;
  a set of labeled tags 202 that contain the requisite hardware to respond to queries from a reader;
  a reader that is compatible with the available collection of tags 202;
  a rotational 3-DOF motion tracker to control the orientation of the scanning plane in an ultrasound simulator;
  a component to relay information from the motion tracker and reader to the computation engine;
  an ultrasound simulator technology that runs on the computation engine and provides a training environment for teaching how to select a correct image window and acquire an optimal view;
  A virtual body 108 that serves as a simulated counterpart to the animate or inanimate training object with affixed tags 202; and
  a tool to define a mapping between tags 202 and positions on the virtual body 108.

Embodiments of the ultrasound training method involve providing the hardware and software of the extended-spectrum ultrasound simulation system and directing the trainee 206 in the use of the system. This method would assist a trainee 206 in acquiring the skills of finding an image window and an optimal image view. The method may comprise a setup step in which the trainee 206 places tags 202 on an animate or inanimate training object. After the setup step, the trainee 206 may begin the simulation, which involves moving the reader and motion tracker, while viewing on a display 100 a virtual body 108, virtual ultrasound probe 110, and a simulated ultrasound 102, as depicted in FIG. 1.

Figure 2:
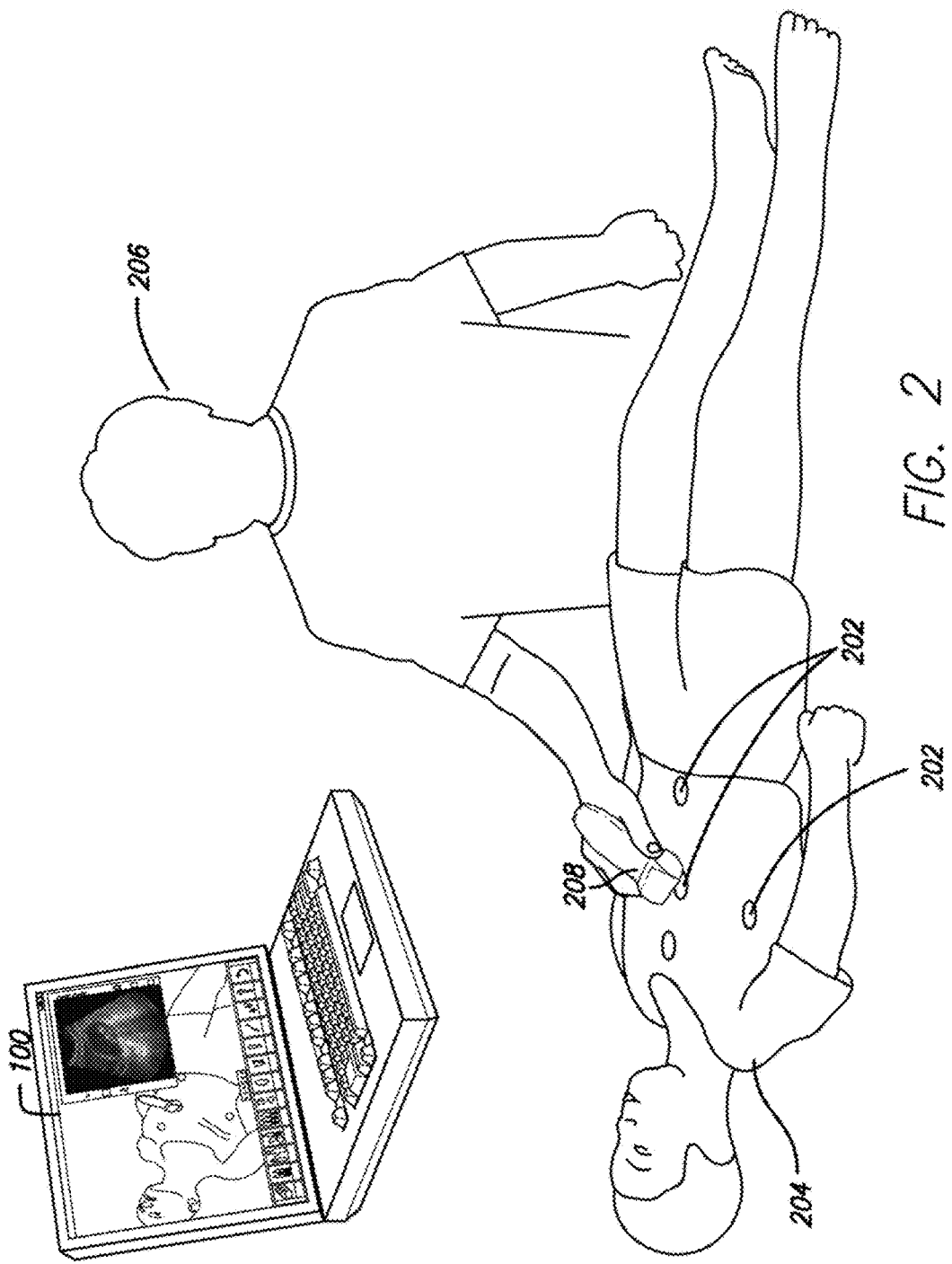
FIG. 2 shows a perspective view of a person training on an animate training object in accordance with embodiments of the present disclosure.
Figure 3:
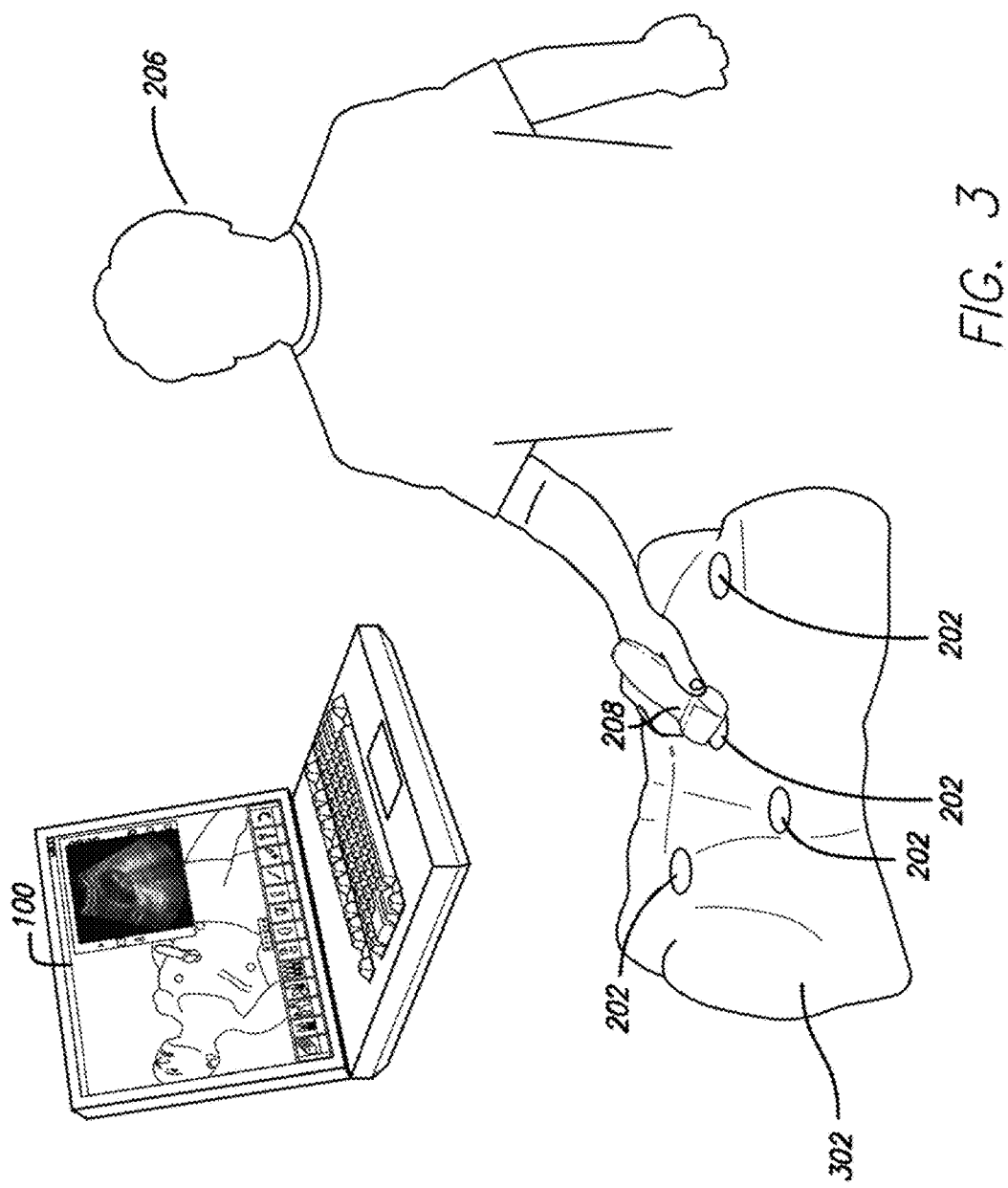
FIG. 3 shows a perspective view of a person training on an inanimate training mannequin in accordance with embodiments of the present disclosure.
Figure 4:
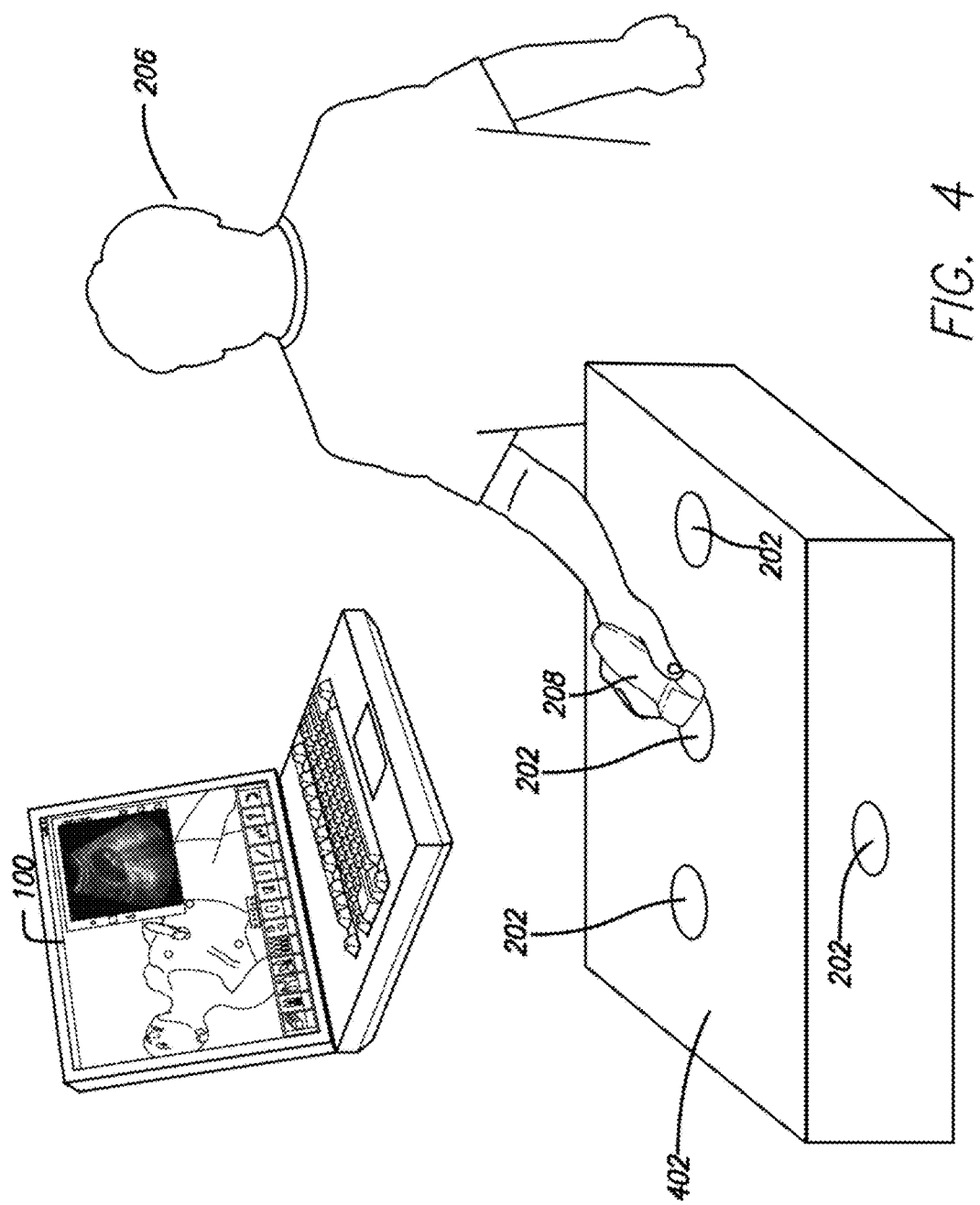
FIG. 4 shows a perspective view of a person training on an inanimate training object in accordance with embodiments of the present disclosure.
Figure 5:
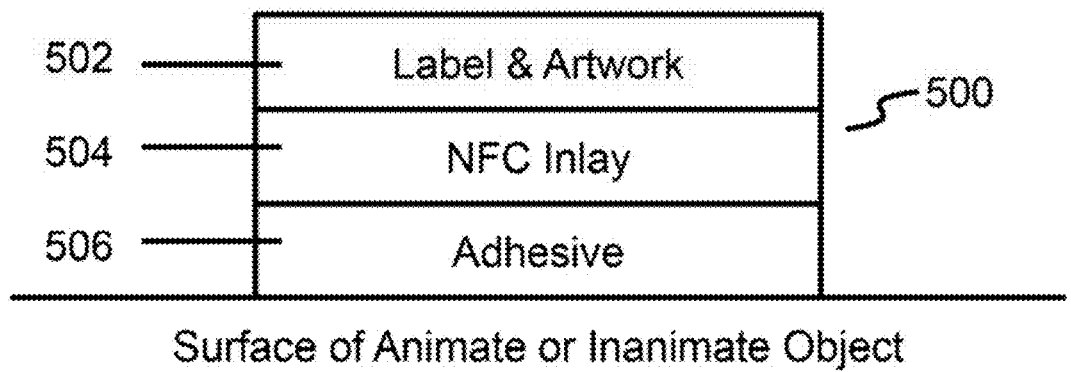
FIG. 5 shows a side view of a tag assembly in accordance with embodiments of the present disclosure.
Figure 6A:
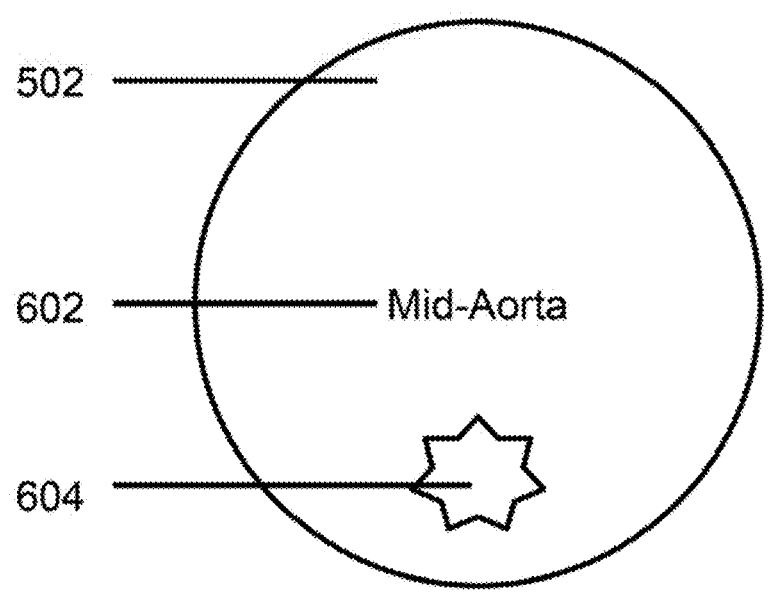
FIG. 6A shows a top view of a first layer of a tag assembly in accordance with embodiments of the present disclosure.
Figure 6B:
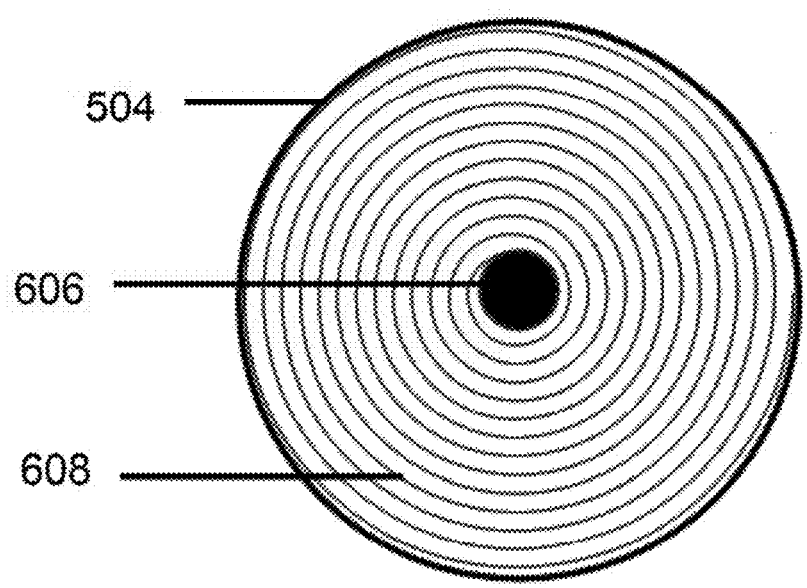
FIG. 6B shows a top view of a second layer of a tag assembly in accordance with embodiments of the present disclosure.
Figure 6C:
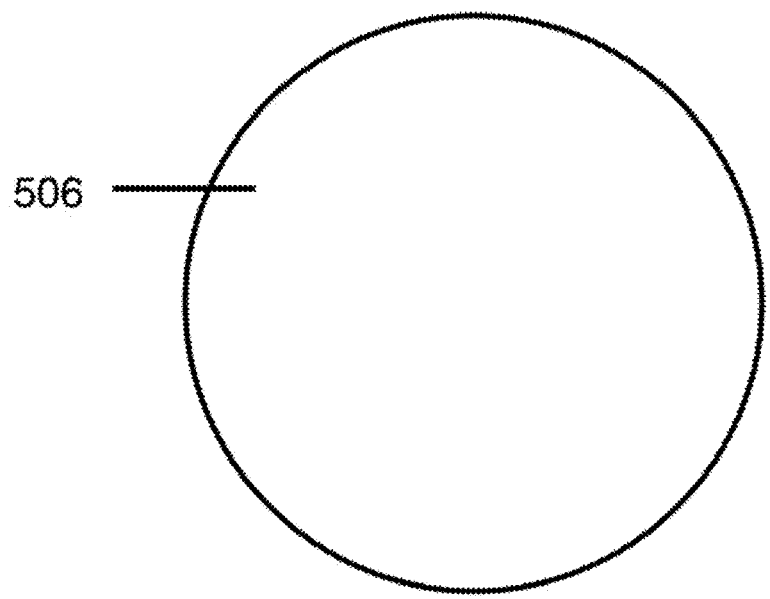
FIG. 6C shows a top view of a third layer of a tag assembly in accordance with embodiments of the present disclosure.

As discussed, the tags 202 may be used with animate or inanimate models/objects. In some embodiments, the animate training model 204 is a live human being, as shown in FIG. 2. In some embodiments, the inanimate training models are mannequins 302 of a human being or a portion of a human being, as shown in FIG. 3. In some embodiments, the inanimate object may be a simple structure 402, such as a box or a sheet of paper, as shown in FIG. 4. As demonstrated, the use of tags 202 allows the ultrasound training method to be flexible in use and cost. Further embodiments of training models may be used based on a desired type of simulation, such as to simulate different body types, body parts, animals, or other such factors.

In some embodiments, the tags 202 are labeled so that the user can easily identify where to affix the tags 202 on the animate or inanimate object. In some embodiments, the simulation software directs a user in the process of affixing the tags 202 on the animate or inanimate object. In some embodiments, the tags 202 may be provided already affixed to a training object so a trainee 206 does not need to worry about setting up or losing the tags 202.

The tags 202 should have an ID that is mapped to locations on the virtual body 108. The system needs to know how to establish a correspondence between the ID of a tag 202 and a set of coordinates on the virtual body 108. An example of a mapping may be:
  04087682922A81→Left Upper Quadrant→(12.34, 45.78, 74,57)
  040AB702BC2B80→Left Chest→(87.36, 29.15, 94.46)
  04107582922A81→Mid-Aorta→(73.82, 75.92, 40.24)

In preferred embodiments, the tags 202 are passive NFC tags 202, which are inexpensive, durable, and do not require a battery. Furthermore, NFC tags 202 may be read-only and read/write. If read/write tags 202 are available, the tags 202 can be programmed with a finite set of predefined IDs and the mapping between IDs and locations is hard-coded into the ultrasound simulation software. If the available tags 202 are read-only, the mapping must be defined between a large number of tags 202 with unique IDs and a finite set of labels 602. The number of available tags 202 is divided into multiple sets, where the size of each set matches the number of labels. A mapping between tags 202 and labels is defined and stored into a special file. The user will receive a set of tags 202 and a corresponding file that specifies the mapping of that set of tags 202 to locations on the virtual body.

The tags 202 are designed in a way that they may be easily affixed onto the training model either permanently or for a limited number of uses. If the tag is designed to be affixed permanently to an object, such as a training mannequin 302, they could be embedded directly by the manufacturer. For instance, if a training mannequin 302 features a soft removable skin, the tags 202 could be embedded directly under the skin at the correct locations.

In some embodiments, the tag 202 may be a tag assembly 500 comprising multiple superimposed layers. An example tag assembly 500 having three layers is illustrated in FIG. 5 and FIGS. 6A-6C. The first layer may be a Label and Artwork layer 502 that indicates the location on the virtual body 108 the tag 202 corresponds to with a label 602. This layer may also showcase additional graphics 604 for branding and improving the appearance of the tag. The second layer may be a NFC inlay layer 504 that hosts NFC hardware, which in many cases comprises an integrated circuit 606 and antenna 608 laid out on a flat surface. The third layer may be an Adhesive layer 506, wherein the surface is designed to adhere to the animate and inanimate object. The contact surface of this layer should be covered with an appropriate adhesive to facilitate affixing the tag onto the object. In some embodiments, additional layers may be superimposed to further protect the tag 202 against mechanical stresses, liquids or other hazards the tag 202 may be exposed to.

The reader detects tags 202 over a short distance by employing a number of available radio frequency technologies depending on the type of tag. In preferred embodiments, a low-cost NFC reader and passive NFC tags 202 are used. The NFC reader broadcasts an electromagnetic (EM) wave at a specific frequency. The NFC tag 202 harvests energy from the incoming EM wave using magnetic induction. The tag 202 uses the energy to power a small chip 606 that broadcasts a new EM wave that encodes the unique identification number of the tag 202 according to a predefined protocol. The NFC reader then receives the encoded signal and relays the information to the computation engine.

The rotational 3-DOF motion tracker may comprise one or more sensors for measuring rotation. For example, the motion tracker may comprise a low-cost Inertial Measurement Unit (IMU) composed of a combination of gyroscopes, accelerometers, magnetometers, and other sensors for compensating external disturbances.

Figure 7:
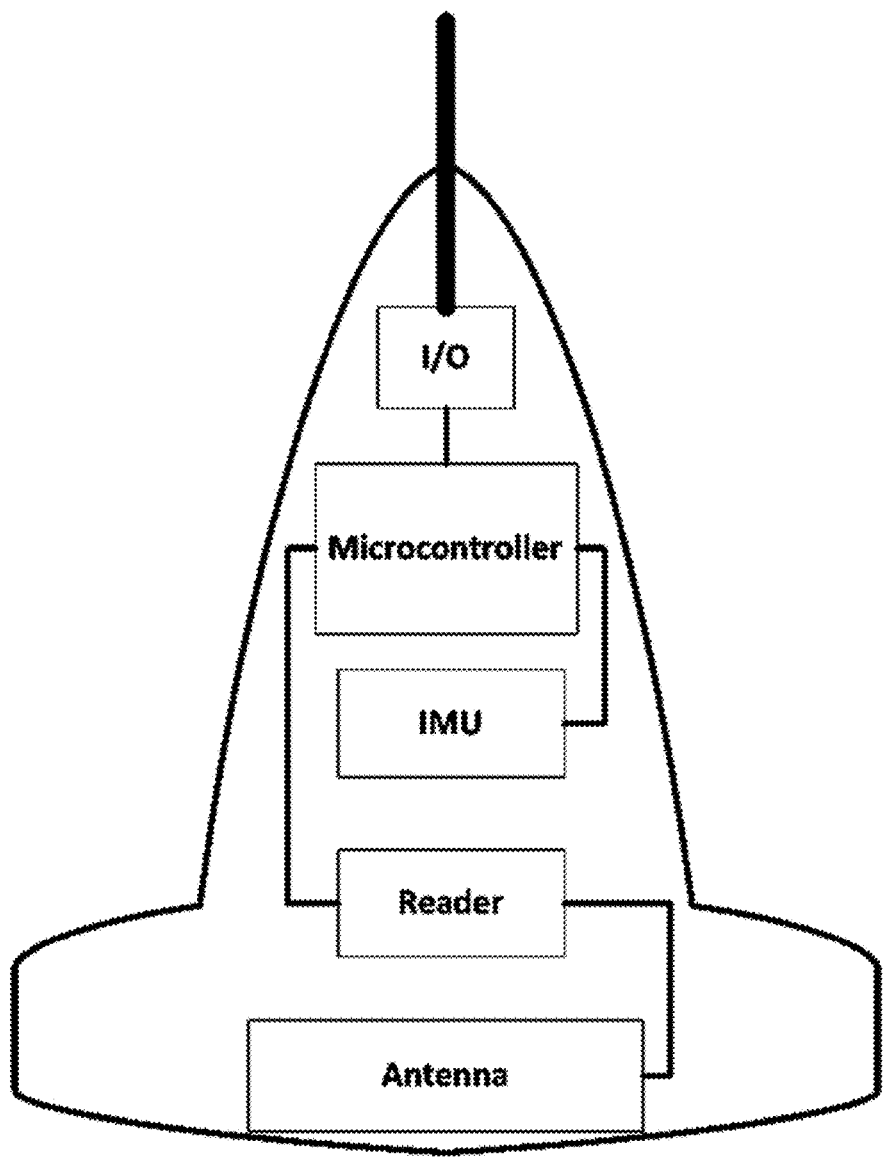
FIG. 7 shows a high level block diagram of a sensor assembly in accordance with embodiments of the present disclosure.

In some embodiments, the reader and the rotational 3-DOF motion tracker are combined into a single unit called a sensor assembly 208, as shown in FIG. 7. The sensor assembly 208 can be used to control the orientation of the scanning plane of an ultrasound device in a virtual environment 106 and detect the ID of a labeled tag 202 and convey it to the computation engine that runs the ultrasound simulation.

The system requires a computing device capable of running the ultrasound simulation software. The ultrasound simulation software should be capable of displaying on a display a graphical user interface (GUI) 104, a virtual body 108, a virtual probe 110, and a dynamic image 102 resembling the appearance of an ultrasound. The computing device should be capable of receiving data from a sensor assembly, including an identified tag and an orientation. The position and orientation of the virtual probe 110 should update based on the data, and the dynamic image 102 should also change.

The ultrasound simulation software may include instructions on placing tags 202 on an animate or inanimate model/object. The ultrasound simulation software may also include a choice of different virtual bodies 108. For example, practitioners may be given a choice to practice ultrasound training on an average male, a pregnant female, or a pet dog. In some embodiments, the instructions on placing tags 202 are dependent on the body type chosen in the ultrasound simulation software.

The ultrasound simulation software may further include scenarios, objectives and instructions on obtaining an image window or optimal image view. For example, a scenario may involve instructing a trainee 206 to place a sensor assembly at the abdomen of the model. If the trainee 206 does not find the correct tag 202, the scenario will not progress. This may instruct a trainee 206 in finding the correct image window. The scenario may then instruct the trainee 206 to find the optimal image view. The trainee 206 will need to orient the sensor assembly at the right orientation to progress. In some embodiments, a specific virtual probe position will be displayed on the computing device, which a trainee 206 will be required to mimic.

Figure 8:
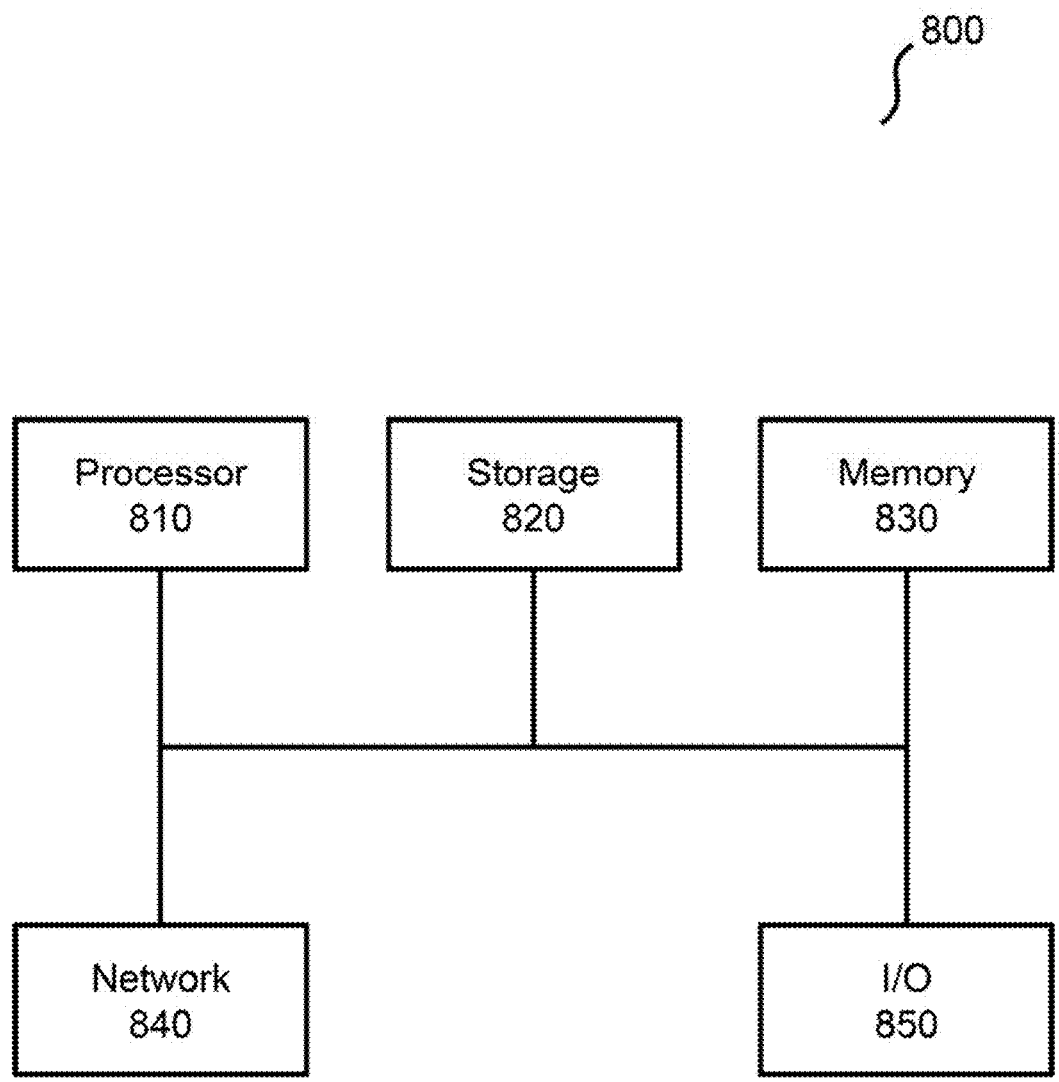
FIG. 8 shows a high level block diagram of a computing device in accordance with embodiments of the present disclosure.

A high-level block diagram of an exemplary computing device 800 that may be used to implement systems, apparatus, and methods described herein is illustrated in FIG. 8. The computing device 800 comprises a processor 810 operatively coupled to a data storage device and memory. Processor 810 controls the overall operation of computing device 800 by executing computing device program instructions that define such operations. The computing device program instructions may be stored in data storage device 820, or other non-transitory computing device readable medium, and loaded into memory 830 when execution of the computing device program instructions is desired. Thus, the method steps of the ultrasound simulation software can be defined by the computing device program instructions stored in memory 830 and/or data storage device 820 and controlled by processor 810 executing the computing device program instructions.

Computing device 800 also includes one or more network interfaces 840 for communicating with other devices via a network. Computing device 800 also includes one or more input/output devices 850 that enable user interaction with computing device 800 (e.g., display, keyboard, touchpad, mouse, speakers, buttons, etc.).

Processor 810 can include, among others, special purpose processors with software instructions incorporated in the processor design and general purpose processors with instructions in storage device 820 or memory 830, to control the processor 810, and may be the sole processor or one of multiple processors of computing device 800. Processor 810 may be a self-contained computing system, containing multiple cores or processors, a bus, memory controller, cache, etc. A multi-core processor may be symmetric or asymmetric. Processor 810, data storage device 820, and/or memory 830 may include, be supplemented by, or incorporated in, one or more application-specific integrated circuits (ASICs) and/or one or more field programmable gate arrays (FPGAs). It can be appreciated that the disclosure may operate on a computing device 800 with one or more processors 810 or on a group or cluster of computing devices networked together to provide greater processing capability.

Data storage device 820 and memory 830 each comprise a tangible non-transitory computing device readable storage medium. By way of example, and not limitation, such non-transitory computing device-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computing device-executable instructions, data structures, or processor chip design. When information is transferred or provided over a network or another communications connection (either hardwired, wireless, or combination thereof) to a computing device, the computing device properly views the connection as a computing device-readable medium. Thus, any such connection is properly termed a computing device-readable medium. Combinations of the above should also be included within the scope of the computing device-readable media.

Network/communication interface 840 enables the computing device 800 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 840 enables the computing device 800 to transfer data, synchronize information, update software, or perform any other suitable operation.

Input/output devices 850 may include peripherals, such as the sensor assembly or the individual reader and motion tracker. Input/output devices 850 may also include monitors or touchscreens for display, a keyboard and mouse for input, speakers for audio output, and other such devices.

Any or all of the systems and apparatus discussed herein, including personal computing devices, tablet computing devices, hand-held devices, cellular telephones, servers, database, cloud-computing environments, and components thereof, may be implemented using a computing device such as computing device 800.

One skilled in the art will recognize that an implementation of an actual computing device or computing device system may have other structures and may contain other components as well, and that FIG. 8 is a high level representation of some of the components of such a computing device for illustrative purposes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for extended spectrum ultrasound training comprising:
    at least one near field communication (NFC) tag, wherein each tag comprises:
        a first layer indicating a virtual body location corresponding to the at least one NFC tag;
        a second layer hosting NFC hardware; and
        a third layer designed to adhere to an object;
    a sensor assembly comprising:
        a NFC reader for identifying the at least one NFC tag; and
        a sensor for measuring an angular orientation of the sensor assembly;
        wherein the sensor assembly does not measure translational motion of the sensor assembly;
    a computation engine, comprising:
        a display;
        at least one processor;
        memory; and
        at least one program, wherein the at least one program is stored in the memory and configured to be executed by the at least one processor, the at least one program including instructions to:
            receive data from the sensor assembly, wherein the data comprises the angular orientation of the sensor assembly and an identification of the at least one NFC tag;
            determine a location of the NFC tag based on a set of coordinates associated with the identification;
            display a virtual body;
            display a virtual ultrasound probe, wherein the virtual ultrasound probe has an orientation corresponding to the orientation of the sensor assembly, and wherein the virtual ultrasound probe is positioned at the virtual body location corresponding to the NFC tag identified by the sensor assembly; and
            generate and display a virtual ultrasound based on the virtual body part and the virtual ultrasound probe.

2. The system of claim 1, wherein the at least one program further includes instructions to:
    instruct a user to move the sensor assembly to a particular NFC tag for practicing locating an image window; and
    instruct the user to move the sensor assembly to a particular angular orientation for practicing finding an optimal image view.

3. A method for training practitioners in ultrasound skills, comprising:
    providing a training simulator system, comprising:
        at least one tag;
        a reader to wirelessly read the at least one tag;
        a rotational 3-DOF (three degrees of freedom) motion tracker;
        a display device;
    displaying a virtual body on the display device;
    displaying a virtual ultrasound probe on the display device, wherein the virtual ultrasound probe has an orientation determined by the rotational 3-DOF motion tracker, and wherein the virtual ultrasound probe has a translational position relative to the virtual body determined by the reader identifying a tag;
    displaying an ultrasound scan of the virtual body based on the translational position and the orientation of the virtual ultrasound probe on the virtual body; and measuring translational movement of the rotational 3-DOF motion tracker based on a set of coordinates associated with the at least one tag.

4. The method of claim 3, further comprising instructing at least one placement location of the at least one tag on a model.

5. The method of claim 4, wherein the reader and the rotational 3-DOF motion tracker are housed in a handheld sensor assembly.

6. The method of claim 5, wherein the at least one tag is a passive NFC tag and the reader is a NFC reader.

7. The method of claim 6, wherein the model is an animate body.

8. The method of claim 6, wherein the model is an inanimate object.

9. The method of claim 6, further comprising instructing a user to move the NFC reader to a particular NFC tag in order to train in finding an image window.

10. The method of claim 9, further comprising instructing a user to move the rotational 3-DOF motion tracker to a particular orientation to train in finding an optimal view.

11. The method of claim 10, user interface provides a choice of types of virtual bodies.

12. A system for training practitioners in ultrasound skills, comprising:
    at least one tag, comprising an identification;
    a reader configured to read the at least one tag;

a rotational 3-DOF (three degrees of freedom) motion tracker;
a computation engine comprising:
   a display;
   at least one processor;
   memory; and
   at least one program, wherein the at least one program is stored in the memory and configured to be executed by the at least one processor, the at least one program including instructions to:
      determine a location of the at least one tag based on the identification of the at least one tag by the reader;
      receive an orientation from the 3-DOF motion tracker;
      display a virtual body on the display;
      display a virtual ultrasound probe on the display, wherein the virtual ultrasound probe has an orientation corresponding to the orientation from the 3-DOF motion tracker, and wherein the virtual ultrasound probe is positioned at a location corresponding to the tag;
      display an ultrasound scan of the virtual body based on the orientation and position of the virtual ultrasound probe.

13. The system of claim 12, wherein the reader and the 3-DOF motion tracker are housed in a handheld sensor assembly.

14. The system of claim 13, wherein the tag is a passive NFC tag, and wherein the reader is a NFC reader.

15. The system of claim 14, wherein the at least one tag comprises:
   an identification layer indicating the location on the virtual body the at least one tag corresponds;
   a NFC layer comprising an integrated circuit and antenna; and
   an adhesive layer to adhere to a training object.

16. The system of claim 14, further comprising an inanimate mannequin, wherein the inanimate mannequin has indicators for where to place the at least one tag.

17. The system of claim 16, wherein the at least one program further comprises instructions to move the handheld sensor assembly to a particular tag for training in finding an image window.

18. The system of claim 17, wherein the at least one program further comprises instructions to orient the 3-DOF motion tracker to a particular orientation for training in finding an optimal view.

19. The system of claim 15, wherein the at least one program provides instructions to provide a user selection of virtual body types.

20. The system of claim 19, wherein the at least one program provides instructions to place the at least one tag based on the user selection of virtual body types.

* * * * *